Dec. 18, 1928.   1,695,306
L. F. WIEMER
MILK STRAINER
Filed Jan. 12, 1925
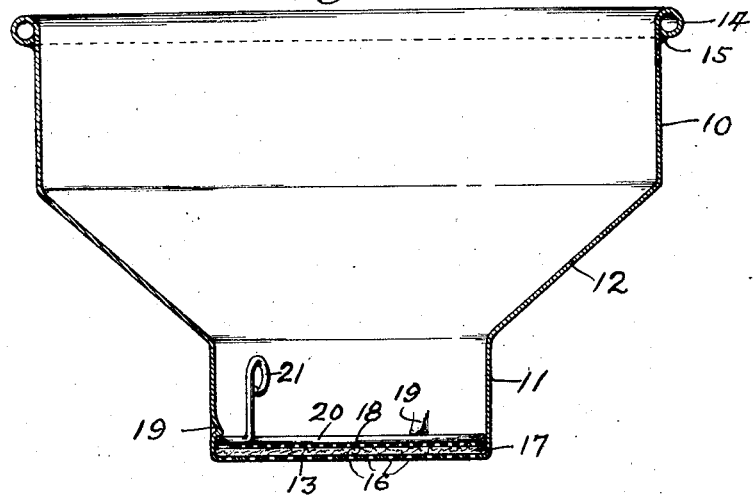
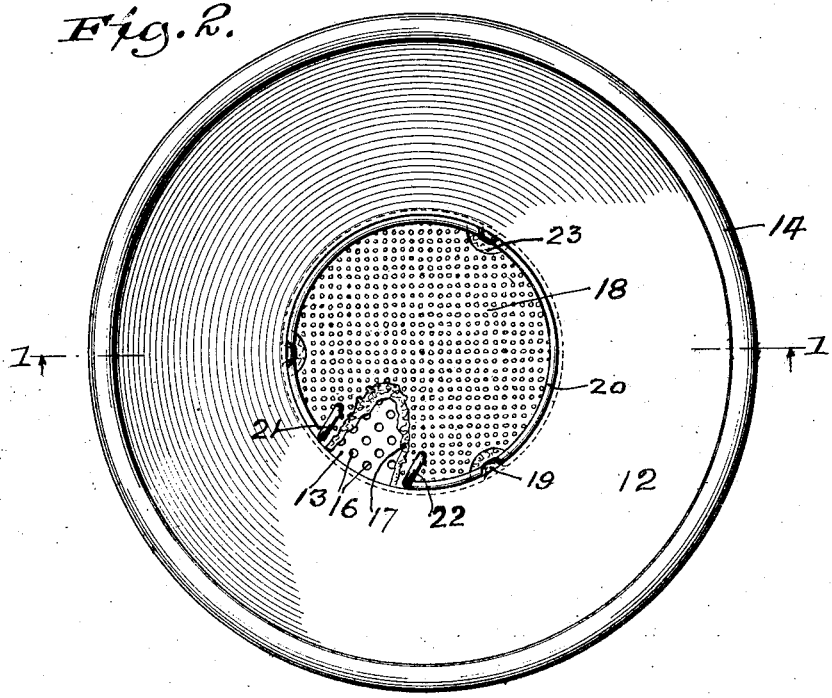
INVENTOR.
Lawrence F. Wiemer,
BY
WITNESS:
ATTORNEYS, Patented Dec. 18, 1928.

1,695,306

UNITED STATES PATENT OFFICE.

LAWRENCE F. WIEMER, OF BURLINGTON, WISCONSIN.

MILK STRAINER.

Application filed January 12, 1925. Serial No. 1,896.

The present invention relates to milk strainers for use in connection with dairying operations, and it resides in an improved construction in which the parts are reduced to the smallest possible number, having due regard for efficiency and the attainment of the best hygienic results. The invention is comprised in a drawn, seamless, tubular structure having the bottom formed integrally therewith, so as to constitute a unit which may be readily and thoroughly cleansed and sterilized and which presents no opportunity for the lodgement of germs in any part thereof.

The integral bottom of the strainer body is perforated for the passage of the milk therethrough, and a straining cloth of fine mesh fabric is arranged upon the said bottom. A perforated metallic straining disc is superposed upon the straining cloth, and the parts are held in assembled position by means of an expansible spring ring resting upon the perforated disc, the ring engaging a plurality of projections formed as indentations in the vertical side walls of the strainer body, so as to wedge the disc and firmly clamp the straining cloth against the bottom of the strainer body.

The specific details of construction will now be described, and the novelty residing in the invention will be pointed out in the appended claims.

In the accompanying drawing:

Figure 1 is a central vertical sectional view on the line 1—1, Fig. 2, showing the construction and arrangement of the parts forming my improved milk strainer.

Fig. 2 is a plan view of the same, some of the parts being broken out to show their relative arrangement and proportions.

In the drawing, the strainer body A, of approximately funnel shape, is composed of a large tubular section 10 at its upper end and a smaller tubular section 11 at its lower end, these tubular sections being connected by the intermediate tapered section 12. The strainer body is drawn into the formation shown from a sheet of metal so as to form a wholly seamless structure with a bottom 13 integral therewith. The construction in the proportions shown and described enables the strainer to be produced with a constricted lower end adapted for ready insertion in the mouth of a milk can, or other receptacle, and at the same time the enlarged diameter of the upper portion provides a desirable reservoir capacity for containing an appreciable quantity of milk while the straining is taking place, and these results are attained without unduly increasing the height of the strainer.

The upper edge of the sheet metal of the strainer body is rolled or wired to form a reinforcing circular head 14, and the meeting line of the returned edge at every point of its contact with the outer wall of the section 10, is smoothly soldered as at 15, to form a tight circumferential seam which will effectively exclude the entry or lodgement of all substances of whatever nature. The bottom 13 is perforated as at 16, for the passage of milk from the strainer.

The construction described is such that after use it may be easily cleansed and sterilized, by reason of its exposed and wholly smooth surfaces, and the entire absence of any features which will permit the lodgement of germs or débris.

A fine-meshed straining cloth 17, conveniently formed as a circular sheet having a diameter which approximates that of the contracted or neck portion 11, is adapted to be placed over the perforated bottom 13, and a perforated metal disc 18 is then positioned upon the straining cloth. Viewing the drawing, and particularly Fig. 2, it will be seen that the perforations in the upper or superposed disc 18, are materially smaller than those in the bottom 13 of the strainer, so that all foreign matter, which despite the most watchful care may find its way into the milk to be strained, will be arrested. The primary straining action of the perforated disc 18 is supplemented by the straining action of the cloth 17, which latter as a secondary strainer will intercept even the most minute particles of such foreign matter, and so permit the milk to pass from the strainer into the receptacle under the same in a state of absolute purity. The milk in being strained in the manner described, will pass freely through the larger perforations in the bottom 13.

The walls of the constricted portion 11 are indented at a plurality of points on a line about its circumference, so as to form projections 19, which latter extend inwardly of the strainer in a plane above but near to that in which the disc 18 lies when the latter has been positioned upon the cloth 17. The distance or space between the upper side of the disc 18 and the under side of the projections 19 is only such as will permit a spring wire or split ring 20 to enter and fill such space, and in its expansion act with a wedging action to cause the disc 18 to press the strainer cloth 17 firmly upon the bottom 13 of the strainer, and prevent disarrangement of the same. The spring wire ring 20 is provided at its approaching ends with upstanding thumb pieces 21 and 22, which are adapted to be pressed toward each other to contract the ring, and enable its insertion in the space under the projections 19.

The diameter of the disc 18 is but a little less than that of the constricted portion 11 of the strainer, so as to fit closely when placed in position, and in order that the projections 19 may not interfere with the movement of the disc 18, the latter is provided upon its periphery with cut out portions 23, spaced apart in accordance with the arrangement of the said projections. Thus, the easy movement of the disc into and out of position is provided for.

After the conclusion of the straining operation, the resilient ring will be withdrawn and the straining disc 18 and cloth 17 removed. The strainer body A will then be cleansed and sterilized. This action will free the whole of its smooth surfaces from adhering matter, and consequently there can be no lodgement of germs on any part thereof. The removable elements may be treated in the same manner. The straining cloths are to be discarded after use. These latter may be in the form of woven or other textile fabrics, or they may be layers of wadding.

Having thus described my invention, what I claim and desire to secure by Letters Patent of the United States, is:

1. A milk strainer the body of which is comprised of a large upper section and a constricted lower section with an integral perforated bottom and inward projections in the lower section near the bottom constructed as a unit, a straining cloth in close contact with the whole of and covering the inner face of the said bottom, a perforated straining disc notched at its periphery resting upon the cloth, said projections permitting movement of the notched disc thereover, and a spring loop engaging under such projections and causing the disc to press the cloth against the bottom.

2. A milk strainer the body of which is constituted of a tubular member reduced at its lower end and provided with an integral perforated bottom and inward projections in the wall of the reduced end constructed as a unit, a perforated straining disc notched at its periphery to permit the disc to pass over the said projections, and a spring loop engaging under such projections to cause the disc to press a straining cloth against the bottom.

In testimony whereof, I have signed my name at Milwaukee, Wisconsin, this 9th day of December, 1924.

LAWRENCE F. WIEMER.